(12) United States Patent
Colasanto et al.

(10) Patent No.: US 8,454,784 B2
(45) Date of Patent: Jun. 4, 2013

(54) AIR-PERMEABLE COMPOSITE FABRIC

(75) Inventors: Thomas C. Colasanto, Tolland, CT (US); Mark Shanley, Plymouth, MA (US); Kimberly Shanley, legal representative, Plymouth, MA (US)

(73) Assignee: Dartex Coatings, Inc., Slatersville, RI (US)

( * ) Notice: Subject to any disclaimer, the term of this patent is extended or adjusted under 35 U.S.C. 154(b) by 199 days.

(21) Appl. No.: 12/113,595

(22) Filed: May 1, 2008

(65) Prior Publication Data

US 2008/0223500 A1  Sep. 18, 2008

Related U.S. Application Data

(60) Continuation of application No. 11/434,017, filed on May 15, 2006, now Pat. No. 7,488,696, which is a continuation of application No. 10/650,098, filed on Aug. 25, 2003, now abandoned, which is a continuation of application No. 09/378,344, filed on Aug. 20, 1999, now abandoned, said application No. 10/650,098 is a continuation of application No. 10/341,309, filed on Jan. 13, 2003, now abandoned, which is a continuation of application No. 09/863,852, filed on May 23, 2001, now abandoned, which is a division of application No. 09/378,344, filed on Aug. 20, 1999, now abandoned.

(60) Provisional application No. 60/098,254, filed on Aug. 28, 1998.

(51) Int. Cl.
*B29C 65/52* (2006.01)
*B32B 37/12* (2006.01)

(52) U.S. Cl.
USPC .......................................... 156/230; 156/331.7

(58) Field of Classification Search
USPC ...................... 156/78, 196, 230, 331.4, 331.7
See application file for complete search history.

(56) References Cited

U.S. PATENT DOCUMENTS

| | | | | |
|---|---|---|---|---|
| 3,050,432 | A * | 8/1962 | Weinbrenner et al. | 156/196 |
| 3,089,806 | A * | 5/1963 | Mizell | 156/264 |
| 3,554,852 | A * | 1/1971 | Sugarman et al. | 442/281 |
| 3,690,977 | A | 9/1972 | Loft et al. | |
| 3,695,967 | A * | 10/1972 | Ross | 156/209 |

(Continued)

FOREIGN PATENT DOCUMENTS

| | | |
|---|---|---|
| CA | 2137341 A1 | 6/1995 |
| GB | 1321643 | 6/1973 |
| JP | 6194752 | 5/1986 |
| WO | 9609165 A1 | 3/1996 |

OTHER PUBLICATIONS

The Textile Institute, Textile Terms and Definitions, Eighth Edition, pp. 88 and 238 (1986).

*Primary Examiner* — Michael Tolin
(74) *Attorney, Agent, or Firm* — Caesar, Rivise, Bernstein, Cohen & Pokotilow, Ltd.

(57) ABSTRACT

An air-permeable composite fabric is provided. The composite fabric has an inner fabric layer, an outer fabric layer, and an intermediate vapor barrier. The vapor barrier is selected from adhesive material and an adhesive/membrane combination designed so the composite fabric has a level of air permeability to allow air flow between the first fabric layer and the second fabric layer and a variable level of water vapor diffusion resistance that decreases as air speed impinging on the composite fabric increases.

15 Claims, 7 Drawing Sheets

U.S. PATENT DOCUMENTS

| | | | |
|---|---|---|---|
| 4,167,612 A * | 9/1979 | Tucker et al. ............... 521/110 |
| 4,443,511 A | 4/1984 | Worden et al. |
| 4,563,229 A * | 1/1986 | Sorez ............................. 156/64 |
| 4,569,088 A * | 2/1986 | Frankenburg et al. .............. 2/81 |
| 4,620,956 A | 11/1986 | Hamer |
| 4,833,026 A | 5/1989 | Kausch |
| 5,013,439 A | 5/1991 | Fisher et al. |
| 5,019,422 A * | 5/1991 | Rose et al. .................... 427/245 |
| 5,034,266 A * | 7/1991 | Kinlaw et al. ................. 442/226 |
| 5,035,943 A * | 7/1991 | Kinlaw et al. ................... 442/79 |
| 5,126,182 A | 6/1992 | Lumb et al. |
| 5,204,156 A | 4/1993 | Lumb et al. |
| 5,236,769 A | 8/1993 | Paire |
| 5,268,212 A | 12/1993 | Lumb et al. |
| 5,283,112 A | 2/1994 | Krishnan |
| 5,354,587 A | 10/1994 | Abayasekara |
| 5,364,678 A | 11/1994 | Lumb et al. |
| 5,474,824 A | 12/1995 | Martakos et al. |
| 5,529,830 A | 6/1996 | Dutta et al. |
| 5,660,918 A | 8/1997 | Dutta |
| 5,673,433 A | 10/1997 | Rothrum |
| 5,695,868 A | 12/1997 | McCormack |
| 5,750,444 A | 5/1998 | Jarrell et al. |
| 6,036,721 A | 3/2000 | Harren et al. |
| 6,190,482 B1 | 2/2001 | Colasanto |
| 6,258,308 B1 | 7/2001 | Brady et al. |
| 6,263,511 B1 | 7/2001 | Moretti |
| 6,511,927 B1 | 1/2003 | Ellis et al. |
| 7,329,622 B1 | 2/2008 | Ulli |
| 7,488,696 B2 | 2/2009 | Rock et al. |
| 2009/0186548 A1 | 7/2009 | Rock et al. |
| 2009/0197491 A1 | 8/2009 | Rock et al. |

* cited by examiner

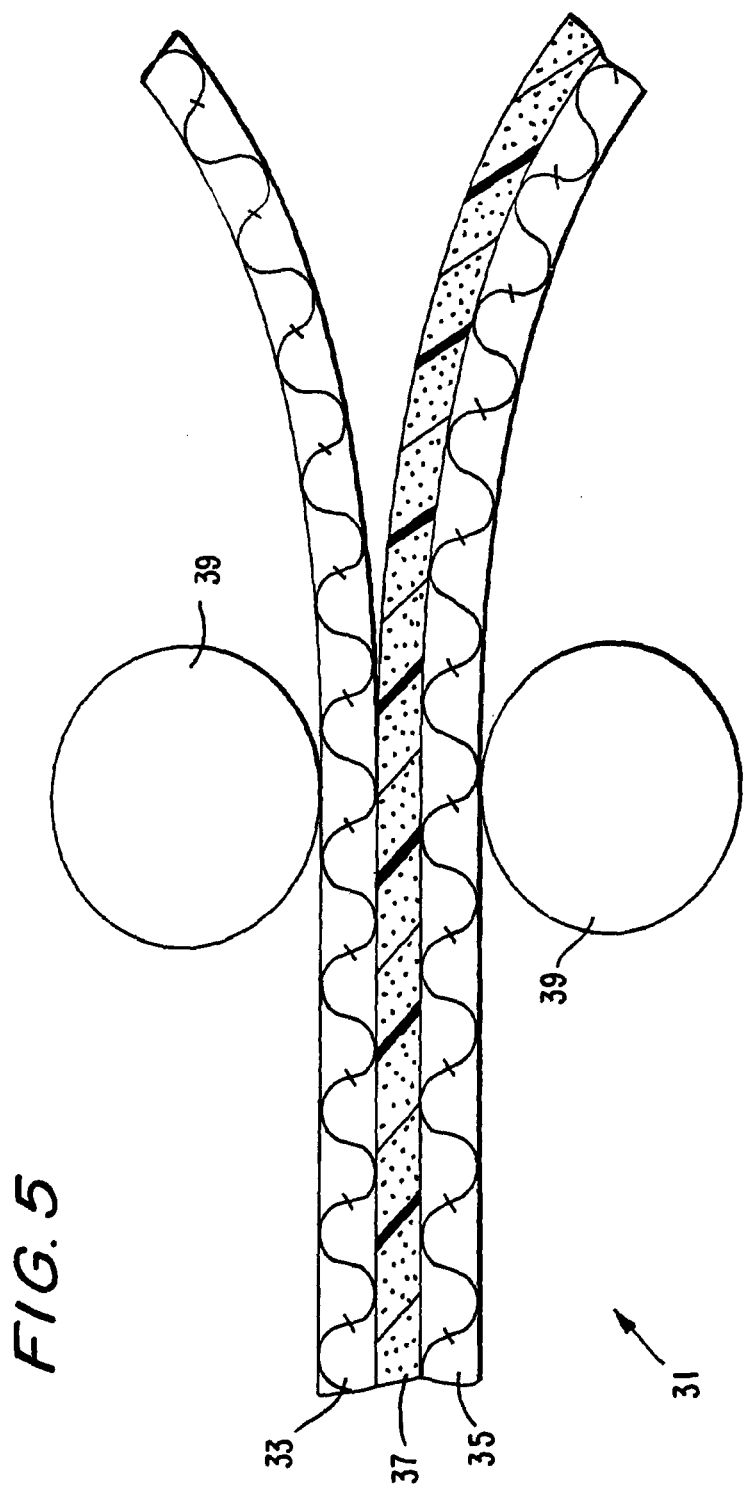

AIR-PERMEABLE COMPOSITE FABRIC

This application is a continuation of and claims the benefit of U.S. application Ser. No. 11/434,017, filed May 15, 2006, now U.S. Pat. No. 7,488,696, which is a continuation of U.S. application Ser. No. 10/650,098, filed Aug. 25, 2003, now abandoned, which is a continuation of U.S. application Ser. No. 09/378,344, filed Aug. 20, 1999, now abandoned, which claims the benefit of U.S. Provisional Application No. 60/098,254, filed Aug. 28, 1998, now expired. U.S. application Ser. No. 10/650,098, filed Aug. 25, 2003, now abandoned, is also a continuation of U.S. Ser. No. 10/341,309, filed Jan. 13, 2003, now abandoned, which is a continuation of U.S. application Ser. No. 09/863,852, filed May 23, 2001, now abandoned, which is a divisional of U.S. application Ser. No. 09/378,344, filed Aug. 20, 1999, now abandoned. The contents of the prior applications are considered part of (and are incorporated by reference in) the disclosure of this application.

BACKGROUND

This invention relates to a fabric material, and more particularly, to a composite fabric having controlled wind permeability.

Conventional composite fabrics are designed to be fully wind resistant. By way of example, reference is made to U.S. Pat. Nos. 5,204,156; 5,268,212; and 5,364,678, all entitled "Windproof and Water Resistant Composite Fabric With Barrier Layer," and which describe a drapable, stretchable, windproof, water resistant and water vapor-permeable composite fabric. This composite fabric includes an inner fabric layer 13A, an outer fabric layer 13B, and a barrier or membrane layer 17A (see FIG. 1). The barrier or membrane layer is constructed to prevent air and water from passing through the fabric layers. Testing has shown that the amount of air flowing through such a composite fabric is on the order or no more than 1 ft.$^3$/ft.$^2$/min.

The membrane or barrier of this type of prior art fabric composite is typically adhered or bonded to the fabric layers with the aid of an adhesive 18. The adhesive can be made from a polyurethane, polyester, acrylic or polyamide. Reference is made to FIG. 1, which illustrates the composite fabric of the prior art.

The above-described fabric composite is nonetheless less than desirable. Because such a composite fabric allows only minimal air flow therethrough, the wearer of the fabric may not be comfortable. When a person wearing a garment constructed with the composite fabric of the prior art performs some type of physical activity, heat is almost always generated, even if the outside air is cold. In order to adjust for this heat generation, the two fabric layers may be selected to have low insulative properties. However, this is disadvantageous, since using such a fabric composite will cause the wearer to feel cold when no activity is being performed.

Another disadvantage with prior art composite fabrics is the level of moisture vapor transmission. For example, a membrane made of polytetrafluroethylene, while having a higher moisture vapor transmission performance than a polyurethane membrane, is still not desirable, since it cannot handle a situation where high levels of moisture vapor or sweat are generated. As a result, wearer discomfort is often prevalent, due to this limitation on moisture transport. Specifically, excess moisture which could not be transported out from the fabric condenses next to the skin-side surface, producing a cold feeling on the skin of the person wearing a garment made from this type of prior art composite fabric.

Accordingly, it is desirable to provide an improved windproof, water vapor permeable fabric which eliminates the problems associated with prior art fabrics.

SUMMARY

Generally speaking, in accordance with the invention, a wind resistant and water vapor permeable composite fabric is provided. The composite fabric includes an inner fabric layer, an outer fabric layer, and an intermediate vapor barrier. The vapor barrier is selected from adhesive material and an adhesive/membrane combination designed so the composite fabric has a level of air permeability to allow air flow between the first fabric layer and the second fabric layer and a variable level of water vapor diffusion resistance that decreases as air speed impinging on the composite fabric increases.

The adhesive may be a continuous film which is mechanically altered by means of crushing, stretching and the like to enhance air permeability or a discontinuous film which inherently enhances air permeability. The adhesive and/or the membrane may be applied directly to a fabric surface of one or both of the fabric layers or may be applied by means of transfer coating from release paper.

In one example, the adhesive functions as a vapor barrier and is disposed between the two fabric layers. The adhesive may be in the form of a foam. One or more rollers may be used to apply pressure to the fabric in order to selectively adjust the air permeability characteristics thereof.

In a second embodiment, the vapor barrier comprises a membrane made from polyurethane, polyamide, polytetrafluroethylene or polyester, or a combination thereof, which is applied between the two fabric layers 15 and adhered thereto with an adhesive. The fabric composite undergoes mechanical processing, such as controlled stretching, in order to achieve a desired level of air permeability.

According to one aspect of the invention, an air-permeable composite fabric comprises a first fabric layer, a second fabric layer, and an intermediate, air-permeable vapor barrier disposed between and bonded to the first and second fabric layers. The intermediate, air-permeable barrier layer is selected from the group consisting of: a foamed adhesive in the form of a discontinuous film, an adhesive in the form of a continuous film mechanically altered by one of crushing and stretching, and a membrane disposed between and adhered to the first fabric layer and the second fabric layer with an adhesive and mechanically altered by stretching. The intermediate, air-permeable vapor barrier layer has a level of air permeability to allow air flow between the first and second fabric layers, and the intermediate, air-permeable vapor barrier layer has a variable level of water vapor diffusion resistance that substantially decreases as air speed of moving air impinging on the fabric increases.

Preferred embodiments of this aspect of the invention may include one or more of the following additional features. The adhesive is selected from the group consisting of polyurethane, acrylics, polyamides, polyesters and combinations thereof. At least one of the first and second fabric layers is rendered hydrophilic. At least one of the first and second fabric layers has a raised surface. The intermediate, air-permeable vapor barrier comprises an adhesive selected from the group consisting of: an adhesive in the form of a mechanically altered continuous film and a foamed adhesive in the form of a discontinuous film. The vapor barrier is exclusively foamed adhesive in the form of a discontinuous film. The intermediate, air-permeable vapor barrier comprises the membrane disposed between the first and second fabric layers and adhered thereto with an adhesive and mechanically altered by stretching, the composite fabric having undergone mechanical processing. The membrane is made from a material selected from the group consisting of polyurethane, polyamide, polytetrafluoroethylene, polyester and combinations thereof. The mechanical processing comprises controlled stretching. The adhesive is selected from the group consisting of polyurethane, acrylics, polyamides, polyesters and combinations thereof.

According to another aspect of the invention, a method of forming an air-permeable composite fabric comprising the steps of: selecting a vapor barrier from the group consisting of a membrane and an adhesive, disposing the vapor barrier between a first fabric layer and a second fabric layer in order to produce the composite fabric, and mechanically processing the composite fabric of such that the intermediate, air-permeable vapor barrier layer has a level of air permeability to allow air flow between the first fabric layer and the second fabric layer and the intermediate, air-permeable vapor barrier layer has a variable level of water vapor diffusion resistance that decreases as air speed impinging on the composite fabric increases.

Preferred embodiments of this aspect of the invention may include one or more of the following additional features. The vapor barrier is a membrane, and the step of mechanical processing comprises controlled stretching of the composite fabric. The vapor barrier is an adhesive, and the step of mechanical processing comprises applying pressure to the composite fabric. The method comprises passing the composite fabric through a plurality of rollers while applying pressure. The method comprises passing the composite fabric through a plurality of heated rollers while applying pressure. The method comprises passing the composite fabric through the rollers at variable controlled speeds. Preferably, the adhesive is foamed. The method comprises disposing the adhesive between the first fabric layer and the second fabric layer by transfer coating using release paper. The method comprises disposing the vapor barrier between the first fabric layer and the second fabric layer as a continuous film of adhesive. The method comprises disposing the vapor barrier between the first fabric layer and the second fabric layer as a discontinuous film of adhesive. The method comprises disposing the vapor barrier between the first fabric layer and the second fabric layer as a film of adhesive using release paper. The method comprises disposing the vapor barrier between the first fabric layer and the second fabric layer by applying the adhesive directly to at least one of the first fabric layer and the second fabric layer.

Accordingly, it is an object of the invention to provide an improved windproof composite fabric, whose wind resistance may be varied.

Still another object of the invention is to provide a composite fabric which is water resistant.

A further object of the invention is to provide an air-permeable composite fabric.

Yet another object of the invention is to provide a composite fabric having a moisture vapor transmission rate which substantially increases as air speed impinging on the fabric increases.

Still other objects and advantages of the invention will in part be obvious and will in part be apparent from the following description.

The invention accordingly comprises the several steps and the relation of one or more steps with respect to each of the others, and the fabric possessing the features, properties and construction of elements which are exemplified in the following detailed disclosure, and the scope of the invention is indicated in the claims.

DESCRIPTION OF DRAWINGS

For a fuller understanding of the invention, reference is made to the following description, taken in connection with the accompanying drawings, in which:

FIG. 5 is a front view in cross-section showing the formation of a third embodiment of the inventive composite fabric;

Like reference symbols in the various drawings indicate like elements.

DETAILED DESCRIPTION

Figure 1:
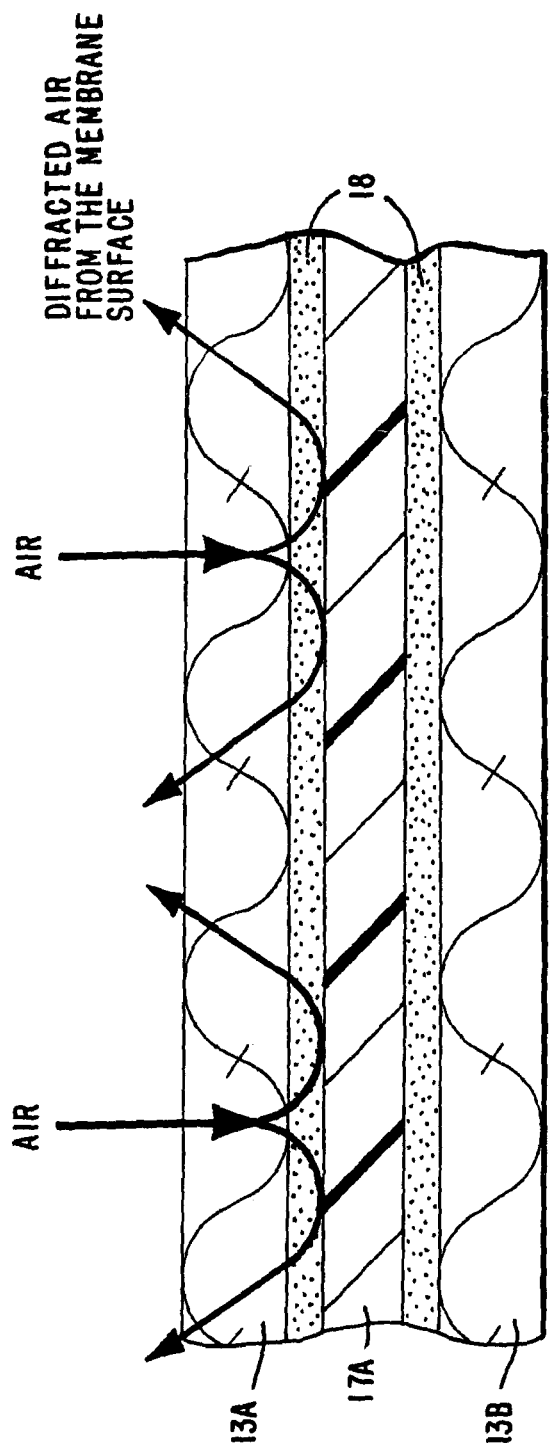
FIG. 1 is a front view in cross-section illustrating a composite fabric of the prior art.
Figure 2:
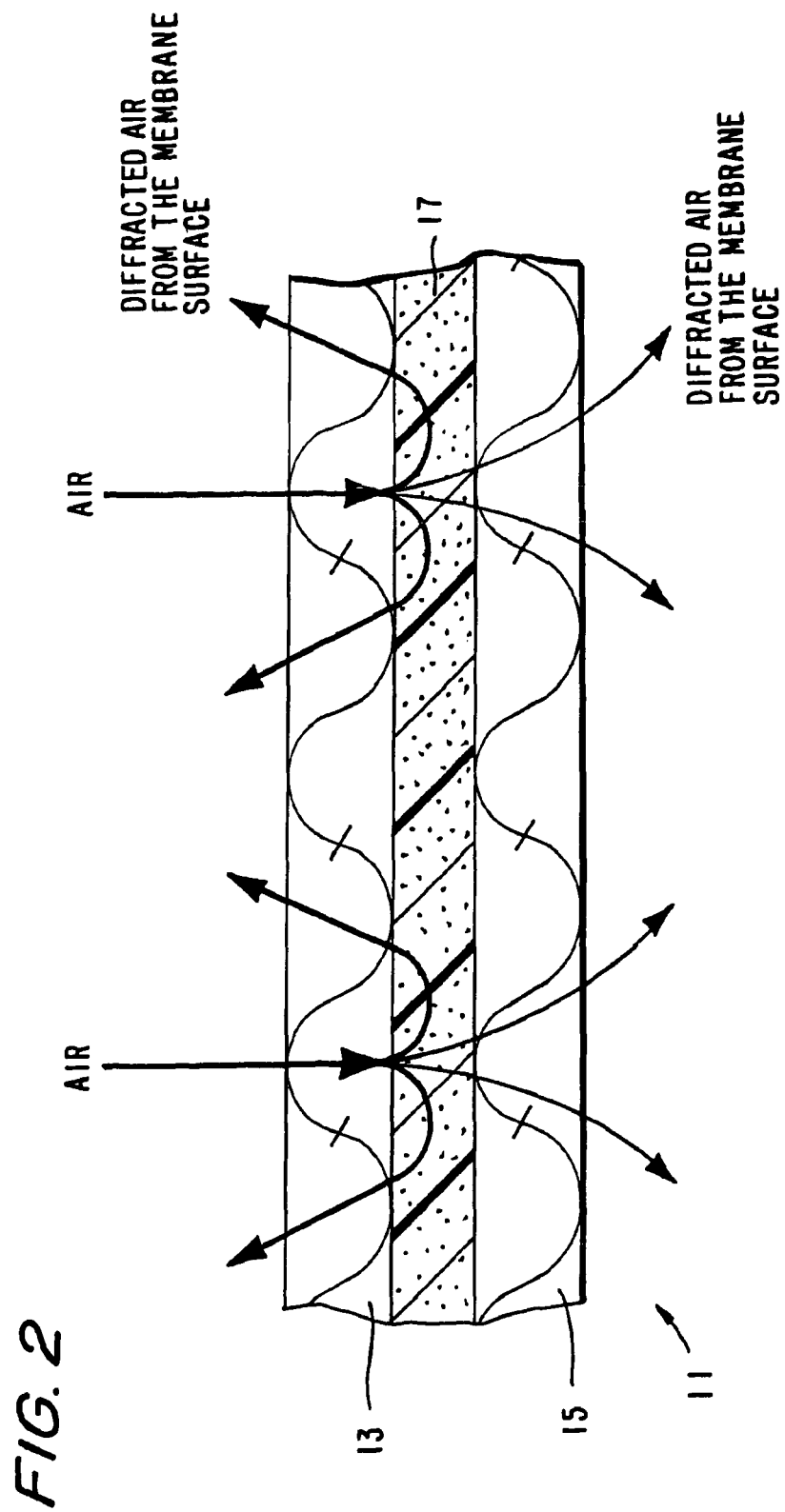
FIG. 2 is a front view in cross-section illustrating a composite fabric made in accordance with the invention.

Referring first to FIG. 2, a first embodiment of the inventive composite fabric, generally indicated at 11, is shown. Fabric 11 comprises first and second fabric layers 13 and 15, and a barrier 17 disposed therebetween. Fabric 11 has variable water vapor permeability, as discussed below. In this embodiment, the barrier 17 consists of an adhesive material. Adhesive 17 may, in one form, be applied by means of transfer coating from release paper at between 0.25 oz/yd$^2$ and 2.5 oz/yd$^2$. Each of layers 13 and 15 may be treated or modified, as described in U.S. Pat. Nos. 5,204,156; 5,268,212; and 5,364,678, including rendering the layers hydrophilic, providing the layers with a raised surface, treating the layers to be water repellant, etc.

Fabric 11 is formed to any specific controlled wind resistant performance level, as discussed below. As shown, air which impinges upon fabric 11 is partially deflected away from the barrier 17 and partially penetrates as well through the barrier 17.

In the absence of moving air, water vapor/moisture from the skin can only transfer through the fabric by means of an absorption/adsorption phenomenon leading to excess heat buildup and moisture. When fabric allows some air to pass through the barrier, it helps in transferring high moisture levels and thus make the wearer more comfortable.

Importantly, as wind speed increases, more air flows through the barrier, allowing more vapor to be dissipated. Thus, the composite fabric of the invention has a relatively high water vapor permeability in moving air, and has substantially reduced resistance to vapor permeability with an increase in air flow. The reduction in wind resistance or increase in air permeability will not cause any significant loss of the thermal insulative properties, as shown in the graphs of FIGS. 3A and 3B now discussed, because the actual amount of air penetrating the barrier is minimal.

Figure 3A:
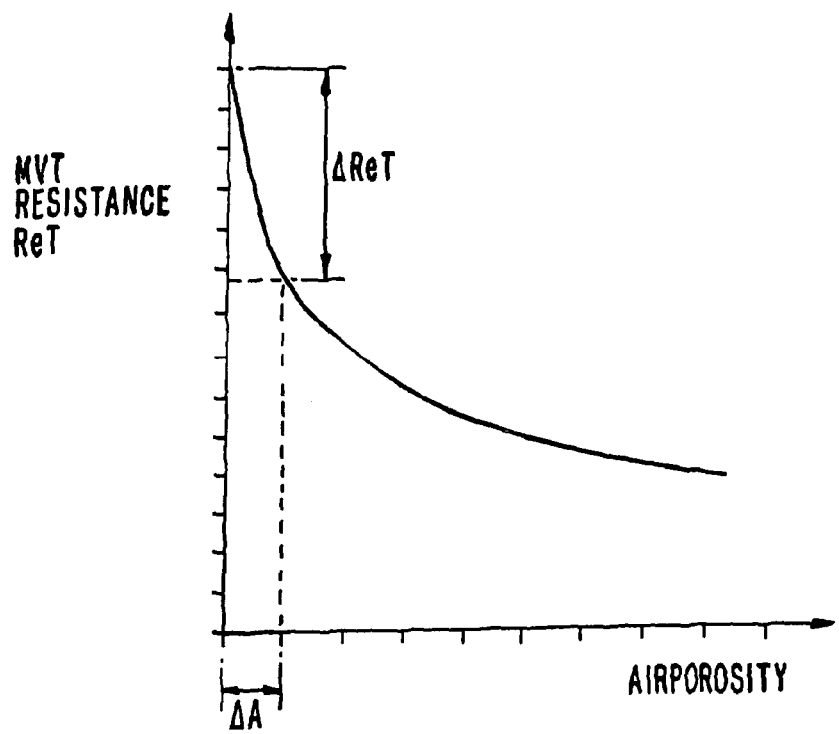
FIG. 3A is a graph which shows the change in moisture vapor transmission as a function of air permeability in the inventive composite fabric.
Figure 3B:
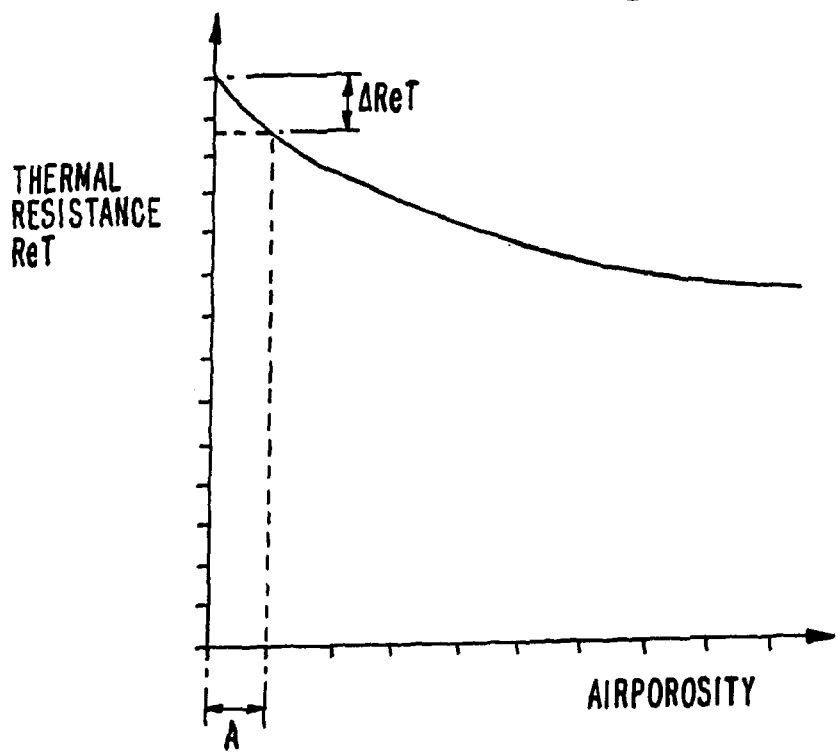
FIG. 3B is a graph showing the change in air permeability as a function of thermal resistance in the inventive composite fabric.

The graph of FIG. 3A illustrates that for any increase in air permeability of the inventive fabric, there is a corresponding decrease in evaporation pressure resistance. The graph of FIG. 3B shows that for any increase in air permeability of the inventive fabric, there will be a corresponding decrease in thermal resistance of the composite fabric. As can be appreciated from reviewing the graphs, there is a substantial difference between the magnitude of change in evaporation pressure resistance and thermal resistance. Evaporation pressure resistance drops far more rapidly than thermal resistance for the same amount of change in air permeability of the composite fabric. Thus, when there is a small increase in air permeability of the composite fabric, the evaporative pressure resistance reduces significantly. As evaporation pressure resistance decreases, more moisture can be transported across the composite fabric, and thus, the loss in thermal resistance which defines the warmth of the fabric is not affected significantly.

Figure 4A:
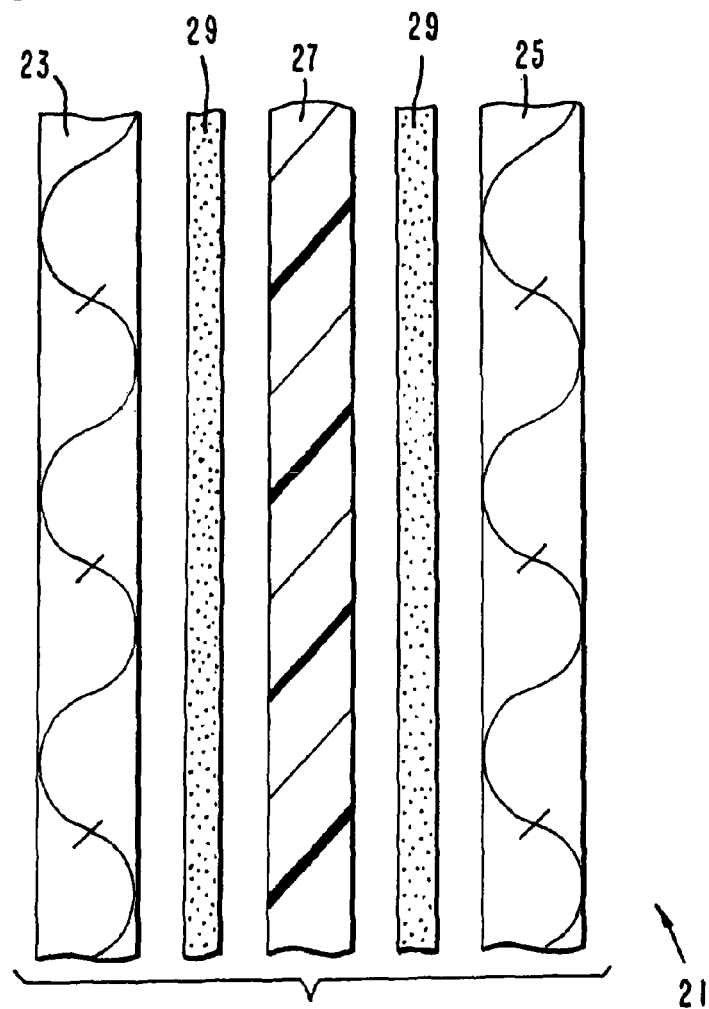
FIG. 4A is a front view in cross-section showing formation of a second embodiment of the composite fabric of the invention.

FIG. 4A describes a second embodiment of the inventive composite fabric, which is generally indicated at 21. Composite fabric 21 includes first and second fabric layers 23 and 25, a barrier that in this case is an intermediate membrane 27, and an adhesive 29 on both sides of membrane 27 for adhering membrane 27 to fabric layers 23 and 25. Adhesive 29 may, in one form, be applied by means of transfer coating from release paper at a thickness of between 0.25 oz/yd$^2$ and 2.5 oz/yd$^2$. Membrane 27 is made from polyurethane, polytetrafluroethyelene or polyester. Membrane 27 may be applied by means of transfer coating from release paper at a thickness of between 0.0001 in. and 0.010 in., or directly on the fabric surfaces at a thickness of between 0.0003 in. and 0.010 in.

Figure 4B:
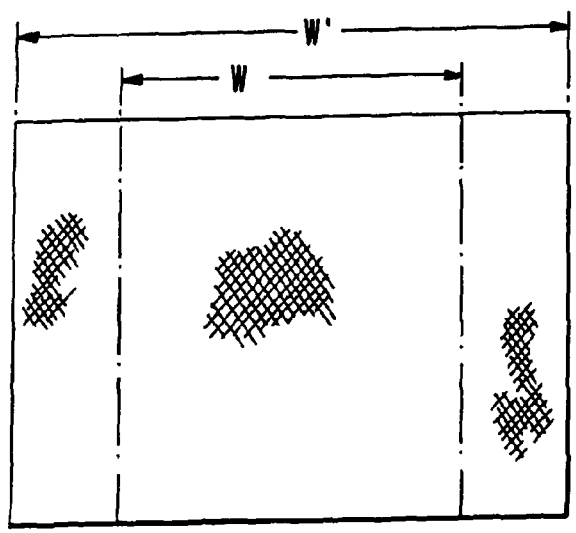
FIG. 4B shows the effects of controlled stretching on the composite fabric depicted in FIG. 4A.

As shown in FIG. 4B, composite fabric 21 having a width, W, is subjected to controlled stretching to produce a composite having a width, W', with a desired specific level of air permeability.

Referring now to FIG. 5, a third embodiment of the inventive composite fabric is shown and generally indicated at 31. Composite fabric 31 includes fabric layers 33 and 35, and a barrier consisting of an intermediate adhesive 37. The adhesive is chosen from a polyurethane, polyester, acrylic and polyamide. Here, adhesive 37 is applied as a foam at between about 0.3 oz/yd$^2$ and 10 oz/yd$^2$. The foam density (mixing air with adhesive) and the amount of adhesive applied are selected depending on the desired air permeability of the composite. Composite fabric 31 is prepared by first applying foam adhesive 37 on one of the opposed surfaces of fabric layers 33 and 35. Once applied, the other fabric layer is put over the adhesive in order to produce the inventive fabric composite. Composite 31 is then mechanically processed by means of a pair of rollers 39, which apply pressure thereto in an amount between about 10 lbs./in.$^2$ and 150 lbs/in.$^2$ in order to produce a composite having a specific level of air permeability.

Figure 6:
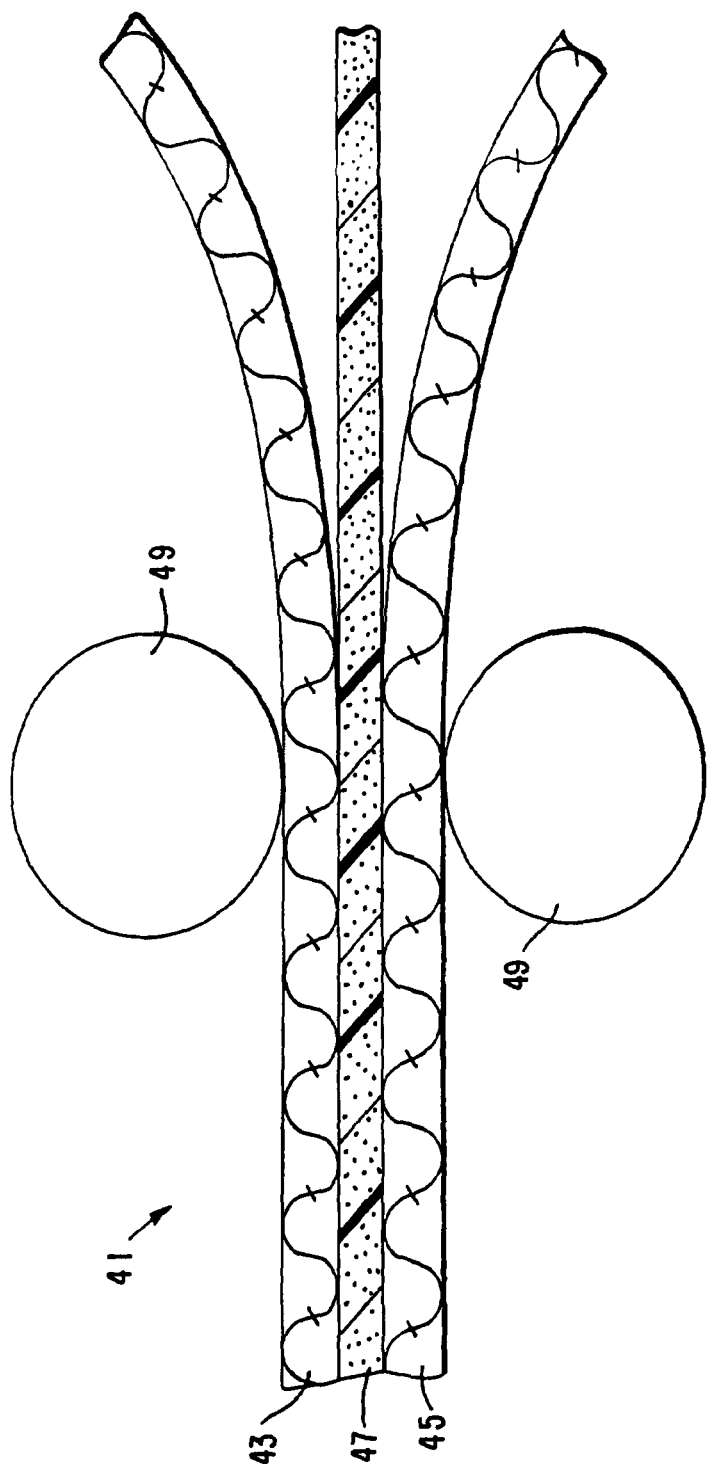
FIG. 6 is a front elevational view in cross-section showing the formation of a fourth embodiment of the inventive composite fabric.

Referring now to FIG. 6, a further embodiment of the inventive composite fabric is shown. Composite fabric 41 comprises fabric layers 43 and 45 and a barrier formed of an intermediate adhesive 47. Air permeability is controlled by applying the adhesive on the fabric and then using some type of mechanical processing, such as treatment with rollers 19, in order to create the desired levels of air permeability.

Still referring to FIG. 6, adhesive 47 may, in one form, be applied by means of a release paper. The adhesive is first placed on the release paper at between about 0.25 oz./yd.$^2$ and 2.5 oz./yd.$^2$, after which one of the fabric layers is put on top thereof in order for bonding to occur. Then, the release paper is stripped from the fabric and the second fabric layer is applied to the other side of the adhesive. The composite then undergoes mechanical processing by rollers 49 (which may be heated to a temperature of between about 100° F. and 375° F.), which apply pressure to the composite fabric. As can be appreciated, changing any mechanical parameter (roller temperature, pressure applied, and speed of the fabric through the rollers) helps change the air permeability characteristics of the composite fabric.

Alternatively, and still referring to FIG. 6, adhesive 47 may be applied directly to one of fabric layers 43 and 45 (at 0.25 oz./yd.$^2$ to 2.5 oz./yd.$^2$) without the use of release paper. As before, the composite fabric will undergo mechanical processing in order to achieve a desired air permeability performance.

Figure 7:
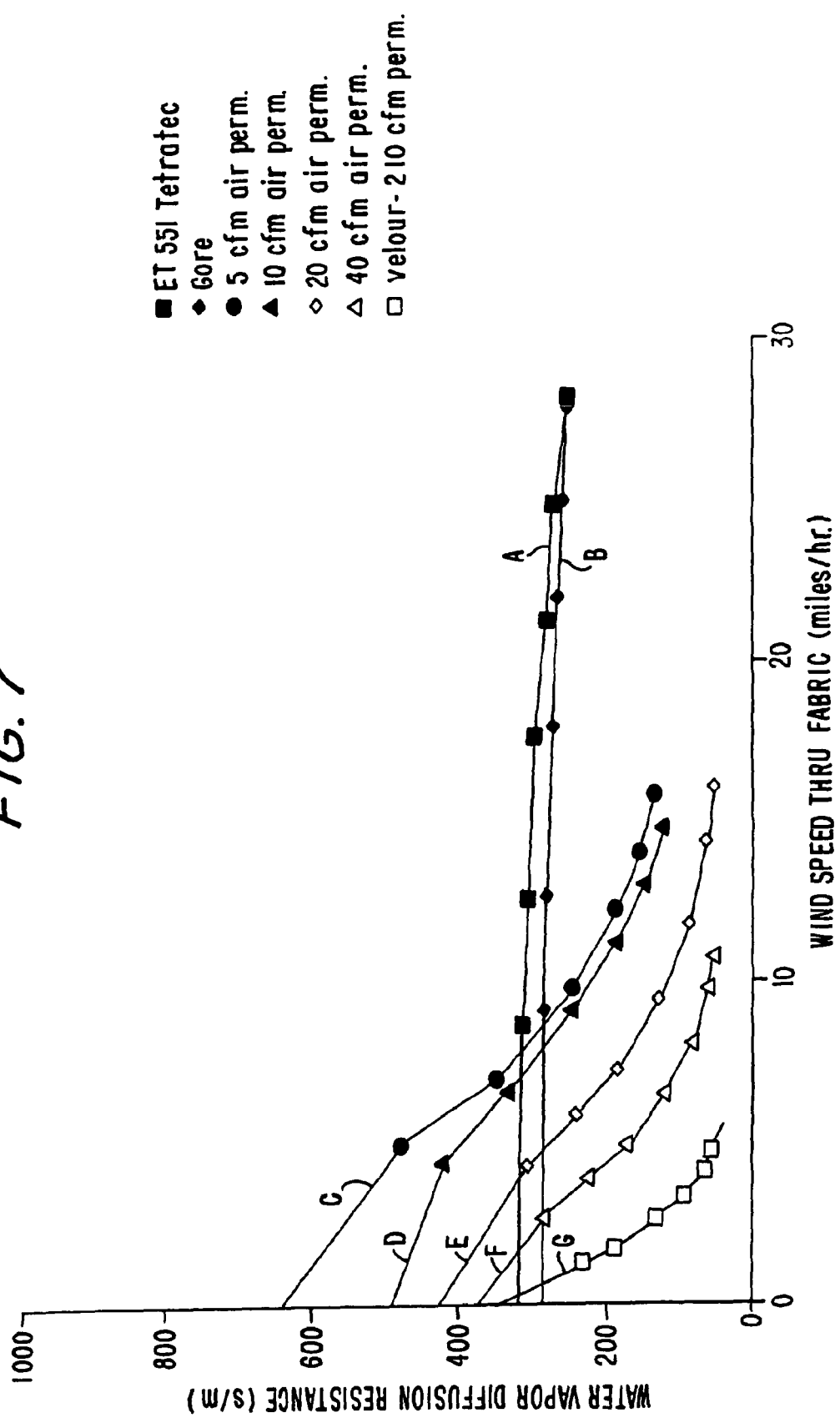
FIG. 7 is a graph showing the relationship of water vapor resistance as a function of wind speed impinging on the inventive fabric as compared to prior art fabrics.

FIG. 7 describes the advantages of the present invention over the prior art. In this figure, lines A and B show the water vapor diffusion resistance for two prior art fabrics (GORE WINDSTOPPER® fabric using GORE-TEX® PTFE membrane from W.L. Gore & Associates, Inc. (Newark, Del.) and ET551 laminate with PTFE from Tetratec Corporation (Feasterville, Pa.)). As seen in FIG. 7, the diffusion resistance for these prior art fabrics is substantially constant. However, in the materials identified by lines C, D, E and F, corresponding respectively to various air permeability level samples (high to low), the vapor diffusion resistance decreases dramatically with increased wind speed through the fabric.

It will thus be seen that the objects set forth above, among those made apparent from the preceding description, are efficiently attained, and, since certain changes may be made in carrying out the above method and in the fabric construction set forth without departing from the spirit and scope of the invention, it is intended that all matter contained in the above description and shown in the drawings shall be interpreted as merely illustrative, and should not be considered limiting.

The following claims are intended to cover all of the generic and specific features of the invention described herein, and all statements of the scope of the invention which might be said to fall therebetween.

What is claimed is:

1. A method of forming an air-permeable composite fabric, said method comprising the steps of:
   providing a first fabric layer;
   providing a second fabric layer;
   providing an adhesive layer comprising a continuous unfoamed film of polyurethane in an amount of about 0.25 oz/yd$^2$ between the first fabric layer and the second fabric layer; and
   calendering together the first fabric layer, the second fabric layer and the adhesive layer to provide the air-permeable composite fabric, wherein the calendering step comprises passing the first fabric layer, the second fabric layer and the adhesive layer through a plurality of rollers at a temperature, a pressure and a speed selected to enhance an air permeability of the adhesive layer and provide the fabric with a predetermined air permeability and a resistance to vapor permeability that decreases with increasing air flow, and no pressure applied during the calendering step is lower than 10 lbs/in$^2$ or higher than 150 lbs/in$^2$.

2. The method of claim 1, wherein the adhesive layer consists of the continuous film of polyurethane.

3. The method of claim 1, wherein the adhesive layer is provided between the first fabric layer and the second fabric layer by transfer coating.

4. The method of claim 1, wherein at least one of the rollers is heated to a temperature of 100° F. to 375° F.

5. The method of claim 4, wherein the pressure applied during the calendering step consists of pressure applied by the rollers to the first fabric layer, the second fabric layer and the adhesive layer.

6. The method of claim 1, wherein the pressure applied during the calendering step consists of pressure applied by the rollers to the first fabric layer, the second fabric layer and the adhesive layer.

7. The method of claim 1, wherein the predetermined air permeability is from 5 to 210 cfm/ft$^2$.

8. The method of claim 1, wherein the predetermined air permeability is from 20 to 40 cfm/ft$^2$.

9. The method of claim 1, wherein the predetermined air permeability is provided without stretching the air-permeable composite fabric.

10. The method of claim 1, wherein the adhesive layer is provided in an amount of 0.25 oz/yd$^2$.

11. A method of forming an air-permeable composite fabric, said method comprising the steps of:
    providing a first fabric layer;
    providing a second fabric layer;
    providing an adhesive layer comprising a continuous, unfoamed film of polyurethane in an amount of about 0.25 oz/yd$^2$ between the first fabric layer and the second fabric layer; and
    calendering together the first fabric layer, the second fabric layer and the adhesive layer to provide the air-permeable composite fabric, wherein the calendering step is conducted at a temperature from 100° F. to 375° F. and at a pressure not lower than 10 lbs/in$^2$ and not higher than 150 lbs/in$^2$ to enhance an air permeability of the adhesive layer and provide the air-permeable composite fabric with a resistance to vapor permeability that decreases with increasing air flow and an air permeability in a range of 5-210 cfm/ft$^2$ without stretching the air-permeable composite fabric.

12. The method of claim 11, wherein the adhesive layer is provided in an amount of 0.25 oz/yd$^2$.

13. The method of claim 11, wherein the adhesive layer consists of the continuous film of polyurethane.

14. The method of claim 11, wherein the adhesive layer is provided between the first fabric layer and the second fabric layer by transfer coating.

15. The method of claim 11, wherein the air permeability is from 20 to 40 cfm/ft$^2$.

* * * * *